(12) United States Patent
Torres Sepúlveda et al.

(10) Patent No.: US 8,910,701 B2
(45) Date of Patent: Dec. 16, 2014

(54) SPACECRAFT MODULAR THERMAL PLATFORM WITH TEMPERATURE RESPONSIVE BYPASS

(75) Inventors: Alejandro Torres Sepúlveda, Madrid (ES); Donatas Mishkinis, Madrid (ES); José Luis Pastor Fernández, Madrid (ES)

(73) Assignee: Iberica del Espacio, S.A., Madrid (ES)

( * ) Notice: Subject to any disclaimer, the term of this patent is extended or adjusted under 35 U.S.C. 154(b) by 972 days.

(21) Appl. No.: 12/327,108

(22) Filed: Dec. 3, 2008

(65) Prior Publication Data
US 2011/0001013 A1    Jan. 6, 2011

(30) Foreign Application Priority Data

Oct. 2, 2008    (WO) ................ PCT/ES2008/070181

(51) Int. Cl.
*F28D 15/02*    (2006.01)
*F28F 27/02*    (2006.01)
*B64G 1/50*    (2006.01)

(52) U.S. Cl.
CPC ............ *B64G 1/506* (2013.01); *F28D 15/0266* (2013.01)
USPC ............. 165/41; 165/272; 165/274; 165/297; 165/103; 165/104.33; 244/171.8

(58) Field of Classification Search
USPC ......... 165/164, 272, 274, 275, 103, 279, 280, 165/281, 282, 283, 297, 41, 104.33; 244/171.8
See application file for complete search history.

(56) References Cited

U.S. PATENT DOCUMENTS

| | | | | |
|---|---|---|---|---|
| 2,322,047 | A | * | 6/1943 | Mormile ........................ 165/297 |
| 2,511,582 | A | * | 6/1950 | Grindrod ........................... 62/98 |
| 3,489,203 | A | * | 1/1970 | Fischell ......................... 165/274 |
| 3,847,208 | A | * | 11/1974 | Ollendorf ........................ 165/47 |
| 4,162,701 | A | | 7/1979 | Ollendorf |

(Continued)

FOREIGN PATENT DOCUMENTS

| | | |
|---|---|---|
| JP | 2001-315700 | 11/2001 |
| WO | 01/20713 A1 | 3/2001 |

OTHER PUBLICATIONS

International-type Search Report in respect of counterpart Application No. PCT/ES2008/070181.

(Continued)

*Primary Examiner* — John Ford
(74) *Attorney, Agent, or Firm* — Oblon, Spivak, McClelland, Maier & Neustadt, L.L.P.

(57) ABSTRACT

A thermal module for use on a spacecraft to control thermal loads coming from a heat source is disclosed. The thermal module includes a two-phase loop system and a heat rejection system. The two-phase loop system includes a thermal collector, a heat flow regulator, a by-pass line, and a condenser. The condenser and the heat rejection system are thermally coupled, such that the heat flow regulator redirects part of the thermal loads from the heat source to the condenser, from which the heat rejection system directs said thermal loads to a heat sink. The temperature of the heat source is regulated by bypassing another part of the thermal loads back to the thermal collector through the by-pass line in a proportional manner, to avoid overcooling the heat source. The heat rejection system is designed based on the hottest possible conditions for the spacecraft mission.

20 Claims, 6 Drawing Sheets

(56) References Cited

U.S. PATENT DOCUMENTS

| | | | |
|---|---|---|---|
| 4,492,266 A | | 1/1985 | Bizzell et al. |
| 5,036,905 A | * | 8/1991 | Eninger et al. ............... 165/41 |
| 5,103,897 A | | 4/1992 | Cullimore et al. |
| 5,137,079 A | * | 8/1992 | Anderson ................. 165/297 |
| 5,588,591 A | * | 12/1996 | Sweitzer, Jr. ............... 237/8 C |
| 6,073,888 A | * | 6/2000 | Gelon et al. ............. 244/171.8 |
| 6,152,213 A | * | 11/2000 | Suzuki ................. 165/104.33 |
| 6,478,258 B1 | * | 11/2002 | Yee ........................ 244/171.8 |
| 7,118,076 B2 | * | 10/2006 | Tjiptahardja et al. ...... 244/171.8 |
| 2008/0217483 A1 | | 9/2008 | Hugon et al. |
| 2010/0236761 A1 | * | 9/2010 | Chou et al. ............. 165/104.28 |

OTHER PUBLICATIONS

Supper, W., "Two-Phase Heat-Transport Systems for Spacecraft", ESA Bulletin, (1991) May, No. 66, pp. 64-70.

* cited by examiner

SPACECRAFT MODULAR THERMAL PLATFORM WITH TEMPERATURE RESPONSIVE BYPASS

FIELD OF THE INVENTION

The present invention relates to a platform for controlling thermal loads, particularly for use on a spacecraft.

BACKGROUND OF THE INVENTION

Most of the components and subsystems of a spacecraft must operate in restricted temperature ranges. This makes thermal control a key matter in the design and operation of a spacecraft with a significant weight, power and cost impact in the overall spacecraft budgets.

Spacecraft thermal control relies on the global spacecraft thermal balance: the heat loads must be rejected to deep space that works as a thermal sink. Since no matter links this sink and the spacecraft, this rejection is made by thermal radiation through dedicated radiators installed on the satellite external surfaces.

Spacecraft thermal loads come from the internal spacecraft equipment dissipation and, externally, from the sun and the earth or from the celestial bodies around which the spacecraft orbits. The thermal systems used in spacecrafts must therefore be able to control equipment which operates at a very high temperature and also discontinuously.

Current thermal control state of the art is based on passive and active methods, these methods depending on elements requiring or not power to be functional. Some of these known elements are coatings, Multi Layer Insulation (MLI), heaters, heat pipes, Loop Heat Pipes, Capillary Pumped Loops, Mechanically Pumped Loops, etc. with insulation, radiation, heat transportation, temperature homogenisation or heating functions. Given the variety of thermal requirements and the harsh space environment, these thermal elements must be selected, designed, manufactured and integrated very carefully.

Document U.S. Pat. No. 4,162,701 discloses a thermal control canister for a spacecraft, maintained at a substantially constant temperature. Fixed conductance heat pipes on the canister walls are connected to variable conductance heat pipes (VCHP), mounted on the radiator structure. The effective radiating area of the radiator structure is controlled by the VCHP in response to sensed temperature of the instrument package or the canister wall. This comparison controls a heater in a gas reservoir containing a non-condensable gas of the VCHP. The VCHP can either be located between the canister and radiators or can be coupled directly between the canister walls and one or more radiators. This solution can be applied on element level but it is difficult to be used for the thermal control of an entire spacecraft. This design is very heavy and very expensive for small spacecrafts. Moreover, additional special systems will be required for large satellites to collect and transfer heat from onboard equipment and to distribute this heat on radiators with VCHP. This makes this design very complex, not very efficient (many thermal interfaces) and not reliable. Also, VCHP are not flexible enough and capable to transfer high power (maximum several hundreds of watts) for shorter distances (up to 2-3 m).

Document U.S. Pat. No. 6,478,258, discloses a loop heat pipe for use on a spacecraft. The loop heat pipe cooling system comprises loop heat pipes routed from internally facing surfaces of one or more internally located equipment panels to externally located radiator panels. Heat is collected at evaporator ends of each loop heat pipe and is transported to condenser ends of the respective loop heat pipe. The loop heat pipes used in the cooling system are flexible and easily routed, so that they can be routed to multiple radiator panels in order to optimize heat sharing between radiator panels. The total number of loop heat pipes used in the cooling system depends on the overall heat load. The system also comprises one or more fixed conductance heat pipes mounted to selected internally facing surfaces of the internally located equipment panels. The problem of this system is an impossibility to control the temperature of the equipment since loop heat pipes are just heat transfer devices.

Document JP 2001315700 discloses a thermal control system for a spacecraft, the system minimizing the generation of vibration and inertia force by eliminating or minimizing rotation of a radiator for radiating heat into space. The system comprises a radiator panel, a control unit and selector valves, the heat generated inside the spacecraft being radiated into space by switching the selector valves without rotation of the radiator panel, so that generation of inertia force or vibration is prevented. The problem of this system is connected with thermal design complexity: two opposite radiators have to be well thermally disconnected but it is difficult to reach this aim since one radiator with embedded heat exchanger is placed on the top of another. Therefore, the thermal control system of JP 2001315700 is not capable of providing good temperature stabilization in a narrow range (several degrees).

Document U.S. Pat. No. 6,073,888, which is considered as the closest prior art of the invention, and upon which the preamble of claim 1 is based, discloses an increased satellite heat rejection system comprising radiating surfaces which are exposed to direct sun light on an intermittent basis. The system is applied to earth-orbiting satellites, especially to those in a geosynchronous orbit, the system comprising a thermal radiator mounted on a face for discharging heat from a thermal load to deep space. A heat conductor extends between the thermal load and the thermal radiator. The system also comprises thermal switches operable for connecting the thermal load to the thermal radiator for cooling when the temperature of the thermal load is above a predetermined level and for disconnecting the thermal load from the thermal radiator when the temperature of the thermal load falls below the predetermined level. This invention is based on VCHP architecture with active temperature control. Heaters are installed on VCHP reservoirs filled by non-condensable gas. Computer governs the heater power as a function of radiators temperatures (dedicated temperature sensors have to be installed on every radiator). The disadvantages of VCHP were already discussed above. Also, although this system is a passive thermal control system but heaters and control electronics require devoted power budget, which is a critical issue for space applications. The thermal switches in U.S. Pat. No. 6,073,888 are operating as ON/OFF devices: such type of control is not precise and sensitive enough for thermal systems, where thermal inertia plays an important role.

The present invention is oriented to the solution of the above-mentioned drawbacks.

SUMMARY OF THE INVENTION

The invention is intended to provide a universal spacecraft modular thermal platform (called SMTP) for use on a spacecraft, such that this platform can easily and quickly be assembled and mounted with different payload/service modules or onboard electronics, independently on the spacecraft mission and the operation scenario. All analysed prior art documents have particular characteristics, so that the known thermal control systems have to be adapted/re-designed and often re-qualified according to the requirements of every customer. The thermal control system of the present invention is passive and absolutely independent on the other systems of a satellite.

The invention provides a platform for controlling the thermal loads coming from a heat source, particularly for use on a spacecraft, this platform being modular and comprising at least one thermal module. Said thermal module comprises a two-phase loop system, a thermal insulation system and a heat rejection system, the two-phase loop system comprising a bypass line, a heat flow regulator, a thermal collector and a condenser.

The modular platform of the invention is independent on satellite orientation in space, is able to manage high heat loads and can be used for different space missions and orbits.

In a preferred embodiment of the invention, no power consumption is required for the fluid circulation in the two-phase loop system with a bypass line (called TPBL) of the thermal module (called TM), since capillary effect grants fluid (heat carrier) circulation in said TPBL, the heat flow regulator providing temperature control by means of bypassing the part of the fluid flow. The heat flow regulator comprises two chambers, a main chamber and a second chamber, separated by flexible contraction bellows.

The main chamber comprises three openings and a moving element joined with the bellows. This chamber is part of the two-phase loop system and the working fluid (usually, in this part of the two-phase loop system, the working fluid is vapour) circulates through the openings in the main chamber. The moving element in the main chamber can connect/disconnect two of the openings creating the links between the thermal collector and the condenser or between the thermal collector and the bypass line, correspondently. Also, the moving element in the main chamber can have some intermediate position connecting all three paths (thermal collector, condenser and bypass line) simultaneously. In this case, the temperature regulation takes place and part of the total heat flow is bypassing the condenser.

The second chamber is used to regulate the temperature set-up point. This second chamber is charged with gas (for instance, argon, nitrogen) with a predetermined pressure value. This pressure is a temperature controlling factor: if the temperature of the controlled equipment is below the specified value, the corresponding saturated vapour pressure of the working fluid will be less than the pressure of the gas in the second chamber. This means that the path to the condenser will be closed and that all flow will be directed to the bypass line. As soon as the heat input grows up, the connection to the condenser (if the condenser is colder than the controlled equipment) will start to be open because the pressure in the two-phase loop system will be higher than the pressure in the second chamber. The moving element in the main chamber will self-adjust its position according to the heat load. If one of the heat rejection systems is hotter than the cooled spacecraft equipment due, for instance, to sun exposure, the remaining "dark" heat rejection systems of the SMTP will dissipate the "excess" of heat to the environment thanks to the heat flow regulator of the two-phase loop system. Such approach provides large flexibility in design of new spacecrafts and significantly reduces time, expenses and resources required for spacecraft designing, manufacturing and testing phases because standard, off-the-shelf, space qualified modular platforms will be used for the satellite onboard equipment arrangement and installation. The modular thermal platform of the invention will warranty required temperature (the set-up point of the heat flow regulator is specified by the customer) and maximum power dissipation of the equipment (SMTP) can be selected from a number of different platforms for different power levels, or by assembling several modular thermal platforms) at any possible operational/mission scenarios.

In this way, differently to the system of document U.S. Pat. No. 4,162,701, the two-phase loop with bypass line (TPLB) in the proposed spacecraft modular thermal platform (SMTP) of the invention can collect, transfer on large distances and distribute the heat on the heat rejection system surface as a single unit without any additional systems/interfaces. In this system, the maximum heat transfer distance is up to tens of meters, being the maximum power of 10 kW.

In contrast with document U.S. Pat. No. 6,478,258, the distinguishing feature of the proposed design of the spacecraft modular thermal platform of the invention is the presence of a heat transfer unit (two-phase loop system with a bypass line, TPBL) with a passive regulator (in a preferred embodiment). The TPLB thermal collector can be connected directly to the heat source or indirectly, through a single heat pipe (for instance, a vapour chamber type) or through a heat pipe network.

With respect to document JP 2001315700, the present invention allows a passive temperature control by heat flow bypassing.

In contrast with document U.S. Pat. No. 6,073,888, proportional control is provided in the present invention: the TPLB heat flow regulator re-directs the part of the heat flow into the condenser (which is thermally coupled with the heat rejection system) and the second part of the heat flow goes back to the thermal collector though the bypass line in a proportional manner.

Other features and advantages of the present invention will be disclosed in the following detailed description of illustrative embodiments of its object in relation to the attached figures.

DESCRIPTION OF THE DRAWINGS

The features, objects and advantages of the invention will become apparent by reading this description in conjunction with the accompanying drawings, in which.

DETAILED DESCRIPTION OF THE INVENTION

Figure 1:
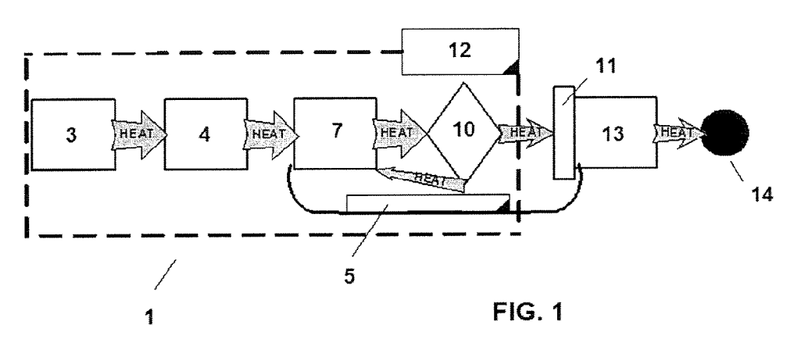
FIG. 1 shows a schematic functional diagram of the thermal module (TM) of the spacecraft modular thermal platform (SMTP) according to the invention.

The invention is therefore intended to provide a spacecraft modular thermal platform 2 (SMTP) (FIG. 3) for controlling the thermal loads coming from a heat source 3, this platform 2 being modular and comprising at least one thermal module 1 (TM) (FIG. 1). The thermal module 1 comprises the following elements:
- at least one heat source 3, typically comprising onboard electronic equipment;
- a two-phase (liquid and vapor) loop system with a bypass line (TPBL) 5, comprising:
  - a bypass line 6
  - a thermal collector 7, preferably an evaporator
  - transport lines 8, 9 for the two phases, vapor and liquid
  - a heat flow regulator 10, preferably a pressure regulating valve
  - a condenser 11;
- a thermal insulation system 12, such as Multi Layer Insulation (MLI);
- a heat rejection system 13, preferably comprising a radiator, and
- a heat sink 14, typically the space.

The thermal module 1 can also comprise an isothermalization system 4, this system 4 preferably comprising a heat pipe frame network.

Figure 2:
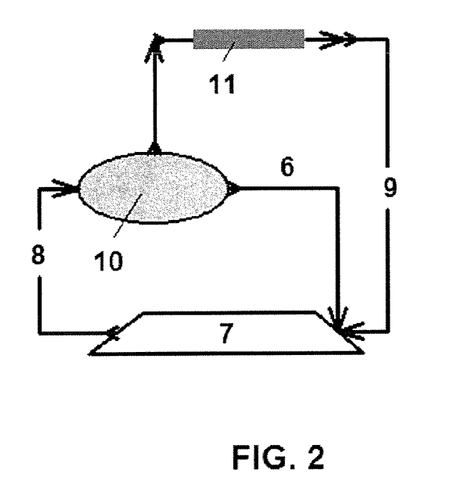
FIG. 2 shows a schematic functional diagram of the two-phase loop system with a bypass line (TPBL) of the thermal module (TM) of the spacecraft modular thermal platform (SMTP) according to the invention.

The two-phase loop system 5 (FIG. 2) is the main element of the thermal module 1 (FIG. 1). A special pump (in a preferred embodiment of the invention the pump is a passive capillary pump, and it can be the same element as the thermal collector 7) provides two phase (liquid and vapor) fluid circulation in the two-phase loop system 5. However, the pump of the two-phase loop system 5 can not only be a capillary pump (preferred type) but other type: mechanical, electro hydrodynamic, jet, piezoelectric bimorph, thermal pulsating, osmotic, etc. In all mentioned cases, except for the capillary pumping, the pump is an additional element, which is typically placed on the liquid line of the transport lines 8, 9, and needs some power budget or consumption.

Figure 11:
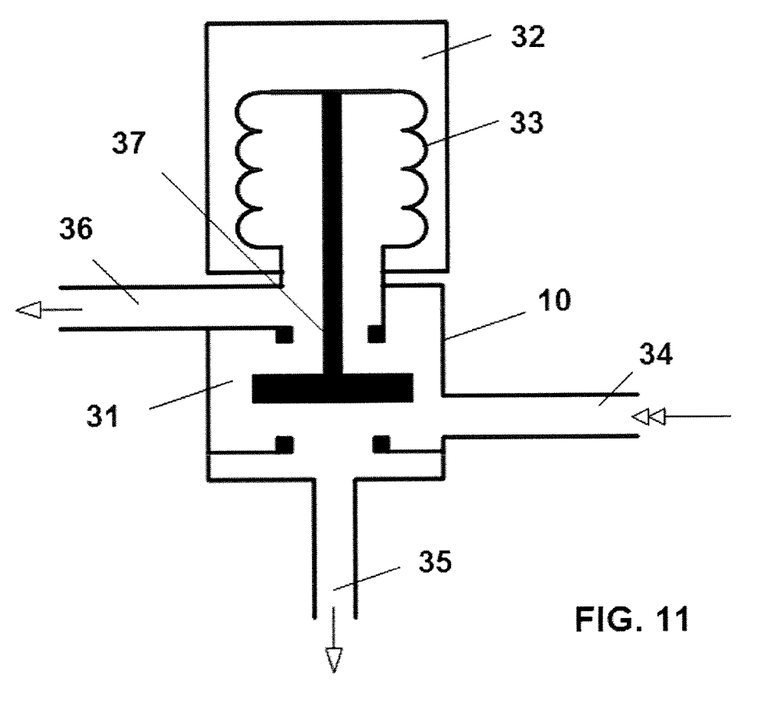
FIG. 11 shows a detail view of the components of the heat flow regulator of the two-phase loop system with a bypass line (TPBL) of the thermal module (TM) of the spacecraft modular thermal platform (SMTP) according to the invention.

In the above-mentioned preferred embodiment of the invention (capillary pump is used, this pump being the same element as the thermal collector 7) no power budget or consumption is required for fluid circulation in the two-phase loop system 5, since capillary effect grants fluid (heat carrier) circulation in the two-phase loop system 5 and the heat flow regulator 10 provides temperature control by means of bypassing the part of the fluid flow. The heat flow regulator 10 comprises two chambers, 31 and 32, a main chamber 31 and a second chamber 32, separated by flexible contraction bellows 33 (FIG. 11).

The main chamber 31 comprises three openings, 34, 35 and 36, and a moving element 37 joined with the bellows 33. This main chamber 31 is part of the two-phase loop system 5 and the working fluid (usually, in this part of the two-phase loop system 5, the working fluid is vapour) circulates through the openings 34, 35 and 36, in the main chamber 31. The moving element 37 in the main chamber 31 can connect/disconnect two of the openings (34, 35 and 34, 36) creating the links between the evaporator 7 and the condenser 11 (34, 35) or between the evaporator 7 and the bypass line 6 (34, 36), correspondently. Also, the moving element 37 in the main chamber 31 can have some intermediate position (as it is shown in FIG. 11) connecting all three paths (34, 35, 36), evaporator 7, condenser 11 and bypass line 6, simultaneously. In this case, the temperature regulation takes place and part of the total heat flow is bypassing the condenser 11.

The second chamber 32 is used to regulate the temperature set-up point. This second chamber 32 is charged with gas (for instance, argon, nitrogen) with a predetermined pressure value. This pressure is a temperature controlling factor: if the temperature in the controlled equipment is below the specified value, the corresponding saturated vapour pressure of the working fluid will be less than the pressure of the gas in the second chamber 32. This means that the path 35 to the condenser 11 will be closed and that all flow will be directed to the bypass line 6, 36. As soon as the heat input grows up, the connection 35 to the condenser 11 (if the condenser 11 is colder than the controlled equipment) will start to be open because the pressure in the two-phase loop system 5 will be higher than the pressure in the second chamber 32. The moving element 37 in the main chamber 31 will self-adjust its position according to the heat load. If one of the heat rejection systems 13 (typically radiators) is hotter than the cooled spacecraft equipment due, for instance, to sun exposure, the remaining "dark" heat rejection systems 13 of the other thermal modules 1 in the spacecraft modular thermal platform 2 will dissipate the "excess" of heat to the environment thanks to the heat flow regulator 10 of the two-phase loop system 5. Such approach provides large flexibility in design of new spacecrafts and significantly reduces time, expenses and resources required for spacecraft designing, manufacturing and testing phases because standard, off-the-shelf, space qualified thermal modules 1 will be used for the satellite onboard equipment arrangement and installation. The spacecraft modular thermal platform 2 (SMTP) of the invention will warranty required temperature (the set-up point of the heat flow regulator 10 is specified by the customer) and maximum power dissipation of the equipment (thermal module 1 can be selected from a number of different modules for different power levels, or by assembling several thermal modules 1 forming a spacecraft modular thermal platform 2) at any possible operational/mission scenarios.

The functionality of the thermal module 1 can be seen in FIG. 1. The heat source 3, such as onboard electronic equipment, delivers thermal power through its base plates. Said thermal power is spread across the support structure of the thermal module 1 by means of the isothermalization system 4, reaching the thermal collector 7. The thermal collector 7 in certain conditions can play the role of temperature equalizer: that is why the isothermalization system 4 is optional, but a preferred element of the thermal module 1 of the invention. This means that the isothermalization system 4 and the thermal collector 7 can either be the same device or can be integrated in single item.

The thermal module 1 has two functions: one is to collect and transfer the thermal power of the heat source 3 to the heat rejection system 13, and the other is to regulate the temperature of the spacecraft heat source 3 by bypassing part of the thermal power back to the thermal collector 7. This bypassing is necessary to avoid the heat source 3 overcooling in a general case, because the heat rejection system 13 is designed based on the hottest possible conditions for the spacecraft mission.

The increase in the number of thermal modules 1 (for instance, up to four, which configures a rectangular spacecraft modular thermal platform, SMTP, 2 comprising four heat rejection systems 13, or up to six, therefore configuring a spacecraft comprising six heat rejection systems 13 located in the sides of the SMTP 2) provides flexibility in the thermal control and the possibility to use efficiently all available areas of the spacecraft for heat dissipation. In case the temperature of the heat rejection system 13 gets higher than the temperature of the thermal collector 7 (for instance, due to the spacecraft sun exposure), the heat flow regulator 10 works as a heat switch, fully thermally separating the heat rejection system 13 and the heat source 3. In this situation, the other thermal modules 1 forming the spacecraft modular thermal platform, SMTP, 2, take the excess of thermal power and reject it into the space or heat sink 14, as the heat rejection systems 13 of the other thermal modules 1 are located in different directions and are not exposed to the sun (see FIG. 9).

The heat flow regulator 10, typically a regulating valve, can be actuated electronically or by means of pressure. In case of the regulating valve 10 being electronically actuated, the thermal module 1 also comprises temperature sensors (not shown) located in the heat rejection system 13, these sensors providing the command to regulate the heat flows inside the TBPL 5. The heat rejection system 13 and the part of the spacecraft to be thermally controlled must be totally insulated from each other, as much as possible. The heat rejection system 13 can be radiating or/and conductive.

Figure 3:
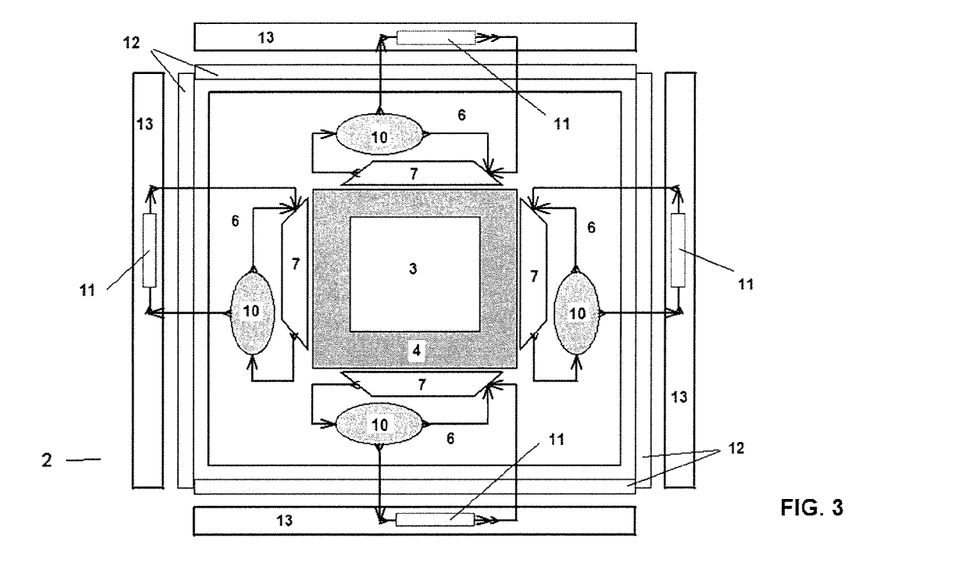
FIG. 3 shows a schematic view of a spacecraft modular thermal platform (SMTP) according to the invention, comprising four thermal modules (TM).

One or several thermal modules 1 can form a complete spacecraft modular thermal platform (SMTP) 2. The typical configuration of the SMTP, 2, is a rectangular block. In the case of FIG. 3, the SMTP 2 comprises four thermal modules 1. At least one of the sides of the SMTP 2 comprises an installed heat rejection system 13. Several spacecraft modular thermal platforms (SMTP) 2 can be combined and/or embedded in other thermal architectures, providing optimum heat management of the thermal architecture by reducing power consumption and increasing heat rejection capabilities.

Figure 4:
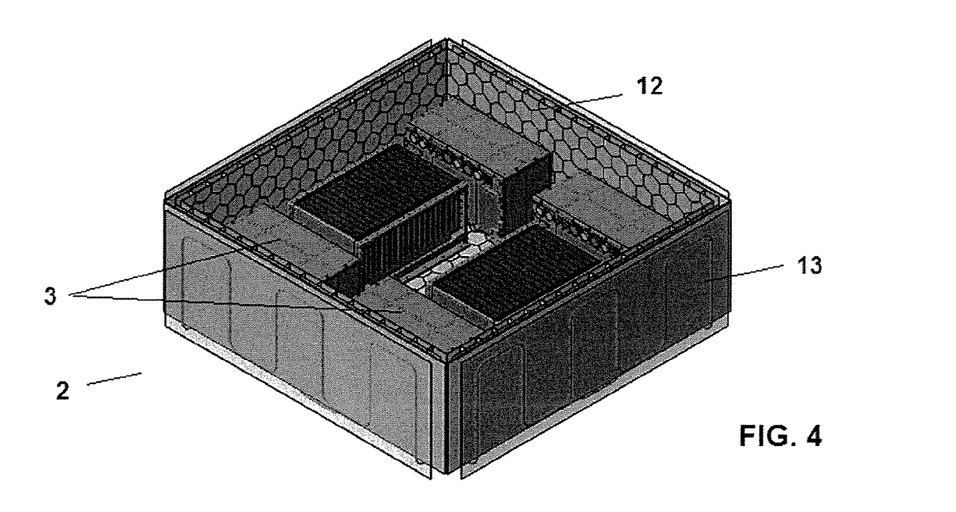
FIG. 4 shows a general view of the spacecraft modular thermal platform (SMTP) of FIG. 3.
Figure 5:
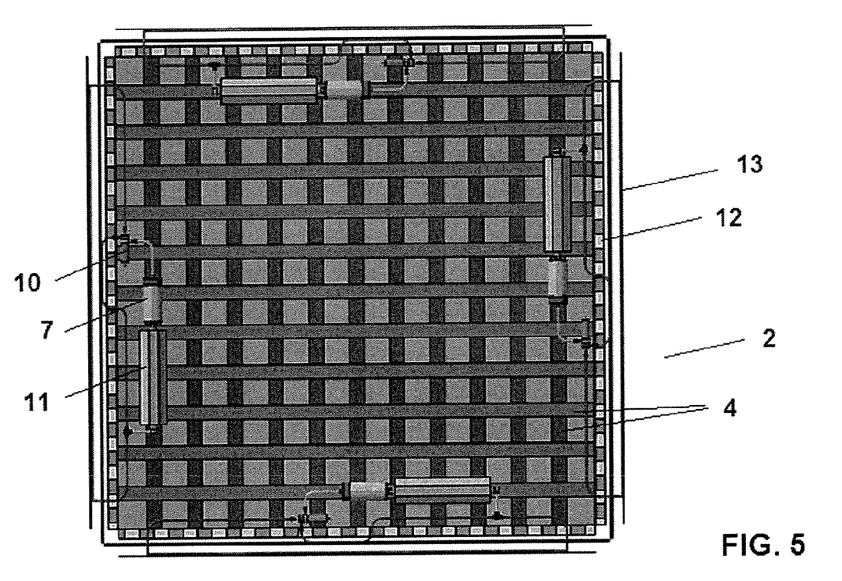
FIG. 5 shows a bottom view of the spacecraft modular thermal platform (SMTP) of FIG. 3.
Figure 6:
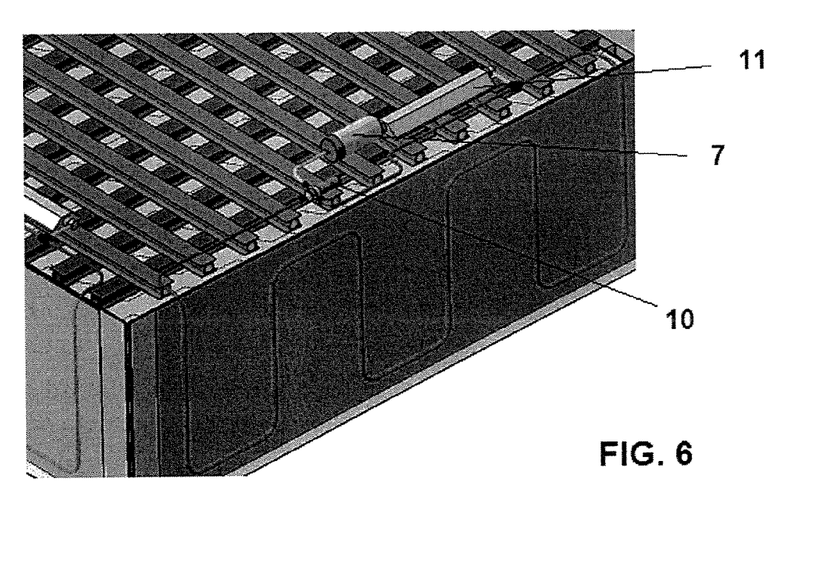
FIG. 6 shows a side detail view of a two-phase loop system with a bypass line of one of the thermal modules (TM) of the spacecraft modular thermal platform (SMTP) of FIG. 3.
Figure 7:
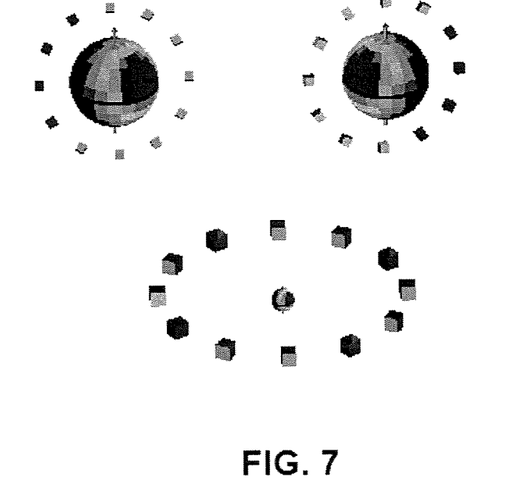
FIG. 7 shows a schematic view of the orbits and spacecraft attitudes on which the SMTP according to the invention will perform.

Different views and details of the SMTP 2 of the invention are shown in FIGS. 4-6.

The main features and characteristics of the thermal module 1, and of the spacecraft modular thermal platform (SMTP) 2 of the invention are the following:
  modularity;
  scalability;
  self-regulation;
  independence on the spacecraft orientation in space;
  possibility to test the spacecraft on ground at any orientation, as the TPBL 5 can operate at any position at gravity field, in contrast with ordinary constant or variable conductance heat pipes (VCHP). This is a distinguish feature of capillary pumped loops that, due to very small effective diameter of pores of capillary wick (pump), are able to operate against gravity up to several meters; typical heat pipes used in spacecrafts can operate only in horizontal orientation or with very small tilt, up to several centimeters if an evaporator is above a condenser;
  autonomous operation;
  passive and energy efficient, as the power budget for the thermal module 1 is reduced to zero (preferred design solution) or to minimum if other than capillary pumps are used;
  possibility to manage high heat loads from the heat source 3, in contrast with ordinary constant or variable conductance heat pipes;
  precise temperature control, that depends only on bypass thermal regulator design and characteristics;
  flexibility in electronic equipment arrangement inside a spacecraft, as the transport lines 8, 9 and the by-pass line 6 in the TPBL 5 have small diameters, therefore being very easy to make a complex routing; and
  generality: the SMTP 2 of the invention can be used for different space missions or orbits (practically, only one parameter has to be verified: the heat rejection capability of the SMTP 2 has to be equal or above the maximum heat load in the hottest environmental conditions).

The performance of the spacecraft modular thermal platform 2 of the invention depends on the orbit and the spacecraft attitude in which said SMTP 2 is installed. Therefore, The thermal performance of the SMTP 2 can be derived from the maximum heat to be rejected for a given maximum operating temperature, and from the heat power consumption required to keep the SMTP 2 at a minimum temperature.

Figure 9:
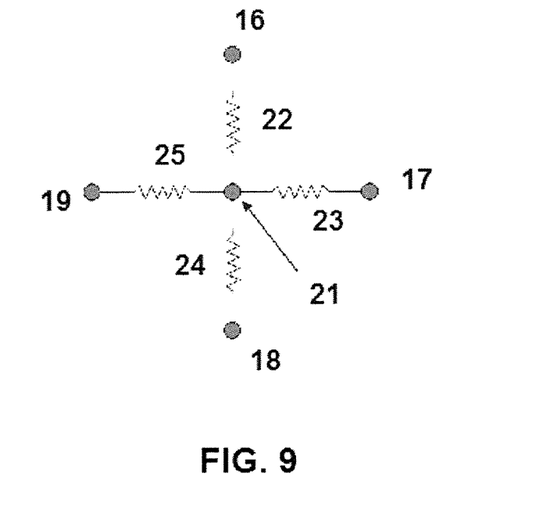
FIG. 9 shows a six node model used for modelling the behaviour of the SMTP according to the invention.
Figure 10:
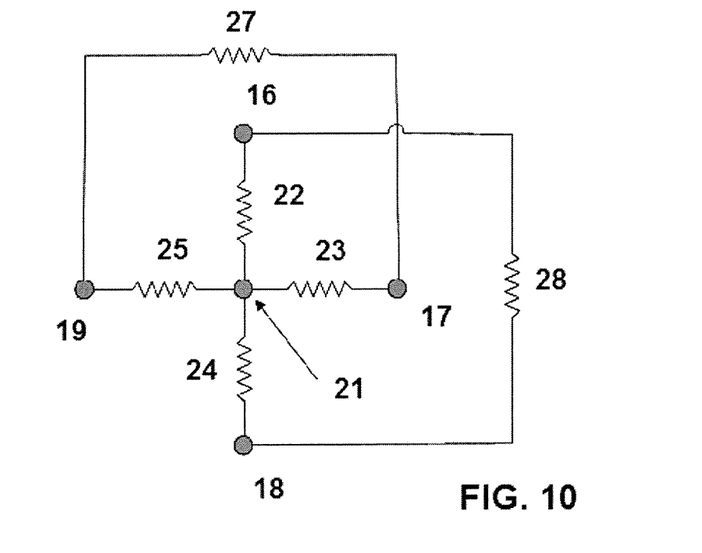
FIG. 10 shows a model used for modelling the behaviour of the SMTP according to the invention comprising heat pipe equalization.

For calculating objects, a thermal mathematical model is used to design the SMTP 2 to be used. As can be seen in FIGS. 9 and 10, a six node model has been used for calculation means. Each heat rejection system 13, such as a radiator, has been modeled as a diffusive node, 16, 17, 18 and 19. The SMTP 2 plus the electrical units 20 attached to it form a single isothermal node 21 that can be diffusive (for verification cases) or boundary (for heater sizing cases). The remaining node is the space or heat sink 14, set at boundary at −269° C.

The heat rejection systems 13, such as radiators, are coupled to the heat sink 14 or space by means of radiation. The SMTP 2 is linked to each heat rejection system 13 by means of a variable conductive coupling, 22, 23, 24, 25, of the TPBL 5, depending on the heat pipe temperature.

Figure 8:
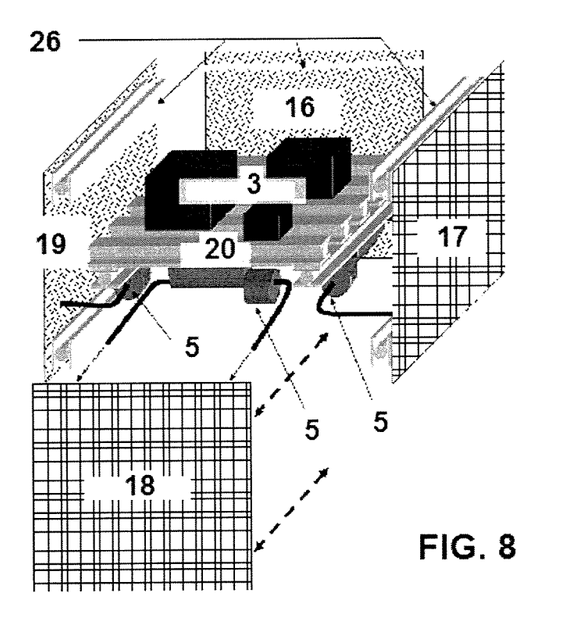
FIG. 8 shows a schematic view of the thermal mathematical model used for modelling the behaviour of the SMTP according to the invention.

Another embodiment of the SMTP 2 of the invention is to connect opposite heat rejection systems 13 of two thermal modules 1 forming said SMTP 2 with heat pipes 26 in order to equalize the working conditions of said heat rejection systems 13, this heat pipe equalization being modeled by conductive couplings, 27 and 28 (see FIGS. 8, 9), between opposite heat rejection systems 13, the heat being bypassed to bypass line 6.

According to test results obtained, and for given missions and TPBL 5 configurations (Typical mission scenarios such as: Geostationary orbit, Low Earth orbit and Sun Synchronous orbit), the results obtained compensate the heat losses when the heat flow regulator 10 (or valve) in the TPBL 5 is closed. This means that the temperature of the heat source 3 is below or is equal to the heat flow regulator 10 set-up point, and the transport lines 8, 9 are therefore not pumping out heat to the heat rejection systems 13.

When the heat source 3 and the external environment are in the hottest conditions (maximum power dissipation of heat source 3 and maximum Solar albedo and Earth radiation along with thermo-optical material properties degradated at end of life conditions), tests have been run out with SMTP 2 with and without equalization heat pipes 26. For both configurations, with and without equalization heat pipes 26, the temperature in the SMTP 2 is practically the same. The only difference in the two configurations or embodiments resides in the heat rejection system 13: the temperature excursions of the heat rejection systems 13 are dumped by the equalization heat pipes 26 configuration.

When the heat source 3 and the environment are in the coldest conditions (minimum power dissipation of heat source 3, stand-by or minimum power modes, and minimum Solar albedo and Earth radiation along with thermo-optical material properties at beginning of life conditions), tests have been run out with SMTP 2 with and without equalization heat pipes 26. The temperature of the SMTP 2 is very stable.

Although the present invention has been fully described in connection with preferred embodiments, it is evident that modifications may be introduced within the scope thereof, not considering this as limited by these embodiments, but by the contents of the following claims.

The invention claimed is:

1. A thermal module for use on a spacecraft to control thermal loads coming from a heat source, the thermal module comprising:
    a two-phase loop system including:
        a thermal collector;
        a heat flow regulator;
        a by-pass line; and
        a condenser; and
    a heat rejection system,
    wherein the condenser and the heat rejection system are thermally coupled,
    wherein the heat flow regulator includes:
        a main chamber separated from a second chamber by a flexible bellows;
        a moving element joined to the flexible bellows in the second chamber, the moving element extending into the main chamber; and
        a gas sealed in a volume between the flexible bellows and internal walls of the second chamber,
    wherein the heat flow regulator of the two-phase loop system redirects a first part of the thermal loads from the heat source to the condenser, from which the heat rejection system directs said first part of the thermal loads to a heat sink,
    wherein the temperature of the heat source is regulated by directing a second part of the thermal loads back to the thermal collector through the by-pass line in a proportional manner, to avoid overcooling the heat source,
    wherein the flexible bellows expands within the second chamber due to an increase in saturated vapor pressure of a working fluid in the main chamber, the moving element being actuated in the main chamber to increase flow of the working fluid to the condenser and to reduce flow of the working fluid to the by-pass line, and
    wherein the heat rejection system is designed based on hottest possible conditions for a spacecraft mission.

2. The thermal module according to claim 1, further comprising:
    a thermal insulation system disposed between the condenser and the thermal collector.

3. The thermal module according to claim 1, further comprising:
    an isothermalization system including a heat pipe frame network.

4. The thermal module according to claim 1, further comprising:
    a pump that circulates a two-phase fluid in the two-phase loop system,
    wherein the pump is one of a mechanical, electro hydrodynamic, jet, piezoelectric bimorph, thermal pulsating, and osmotic pump.

5. The thermal module according to claim 1, wherein the thermal collector is a passive capillary pump.

6. The thermal module according to claim 1, wherein the main chamber is part of the two-phase loop system to control circulation of the thermal loads, and the second chamber is used to regulate a temperature set-up point of the thermal module.

7. The thermal module according to claim 6,
    wherein a position of said moving element adjusts in response to the thermal loads on the thermal module,
    wherein the moving element can adopt a position where the thermal collector and the condenser are linked,
    wherein the moving element can adopt a position where the thermal collector and the by-pass line are linked, and
    wherein the moving element can adopt an intermediate position where the thermal collector, the condenser, and the by-pass line are all linked.

8. The thermal module according to claim 6,
    wherein the gas is sealed in the second chamber at a predetermined pressure such that the predetermined pressure of the gas acts as a temperature controlling factor,
    wherein if the temperature in the thermal module is below a specified value, the corresponding pressure of a two-phase fluid in the two-phase loop system will be less than the pressure of the gas in the second chamber, and a path to the condenser will close to direct all heat flow to the by-pass line, and
    wherein if the temperature in the thermal module increases, the path to the condenser starts opening as the pressure in the two-phase loop system increases above a pressure in the second chamber.

9. A spacecraft modular thermal platform comprising at least one thermal module according to claim 1, the at least one thermal module being combined or embedded in other thermal architectures, providing optimum heat management of the thermal architecture by reducing power consumption and increasing heat rejection capabilities.

10. The spacecraft modular thermal platform according to claim 9, wherein heat rejection systems of at least two thermal modules are connected by means of heat pipes in order to equalize the working conditions of said heat rejection systems, the heat being bypassed to each of the by-pass lines of the at least two thermal modules.

11. The thermal module according to claim 1, wherein the flexible bellows receives a portion of the working fluid from the main chamber due to an increase in saturated vapor pressure of the working fluid in the main chamber.

12. The thermal module as claimed in claim 1, wherein the moving element is actuated towards a first valve seat in the main chamber to reduce flow of working fluid to the by-pass line when the saturated vapor pressure of the working fluid increases in the main chamber, and
    wherein the moving element is actuated towards a second valve seat in the main chamber to reduce flow of working fluid to the condenser when the saturated vapor pressure of the working fluid decreases in the main chamber.

13. A thermal module for use on a spacecraft to control thermal loads from a heat source, the thermal module comprising:
    a thermal collector, a condenser, a first transfer line, a second transfer line, a bypass line and
    a heat flow regulator, including:
        a main chamber separated from a second chamber by a flexible bellows a moving element joined to the flexible bellows in the second chamber, the moving element extending into the main chamber; and
        a gas sealed in a volume between the flexible bellows and internal walls of the second chamber,
    wherein the moving element is in fluid communication with an exit of the thermal collector through the first transfer line,
    wherein the moving element is in fluid communication with an inlet of the thermal collector through the bypass line,
    wherein the moving element is in fluid communication with an inlet of a condenser through the second transfer line, and
    wherein the flexible bellows expands within the second chamber due to an increase in saturated vapor pressure of the working fluid in the main chamber, the moving element being actuated in the main chamber to increase flow to the second transfer line and to reduce flow to the bypass line.

14. The thermal module as claimed in claim 13,
wherein a position of the moving element adjusts in response to a difference between a pressure in the main chamber and a pressure in the second chamber,
wherein the first transfer line is isolated from fluid communication with the second transfer line via the heat flow regulator when the moving element is in a first position,
wherein the first transfer line is isolated from fluid communication with the bypass line via the heat flow regulator when the moving element is in a second position, and
wherein the first transfer line, the second transfer line, and the bypass line are in fluid communication via the heat flow regulator when the moving element is in an intermediate position between the first position and the second position.

15. The thermal module as claimed in claim 13, wherein the gas is argon or nitrogen.

16. The thermal module as claimed in claim 13, wherein the thermal collector is a passive capillary pump.

17. The thermal module as claimed in claim 13, further comprising:
a pump for circulating a fluid within the thermal module.

18. The thermal module as claimed in claim 17, wherein the pump is a passive capillary pump.

19. The thermal module as claimed in claim 13, further comprising:
a thermal insulation system disposed between the condenser and the thermal collector.

20. The thermal module as claimed in claim 13, further comprising:
an isothermalization system including a heat pipe frame network.

* * * * *